United States Patent
Nielsen et al.

(10) Patent No.: US 6,445,492 B1
(45) Date of Patent: Sep. 3, 2002

(54) REDUCTION OF FOUR-WAVE MIXING IN RAMAN AMPLIFIED OPTICAL TRANSMISSION SYSTEMS

(75) Inventors: Torben N. Nielsen, Monmouth Beach; Karsten Rottwitt, Basking Ridge; Andrew John Stentz, Clinton, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/517,864

(22) Filed: Mar. 3, 2000

(51) Int. Cl.[7] .................................................. H01S 3/00
(52) U.S. Cl. ...................................... 359/334; 359/341.3
(58) Field of Search ............................. 359/334, 341.3, 359/341.33

(56) References Cited

U.S. PATENT DOCUMENTS

| | | |
|---|---|---|
| 5,327,516 A | 7/1994 | Chaplyvy |
| 6,320,884 B1 * | 11/2001 | Kerfoot, III et al. ............ 372/3 |
| 6,359,725 B1 * | 4/2002 | Islam ......................... 359/334 |

FOREIGN PATENT DOCUMENTS

EP    1 130 705 A2 *   5/2001

OTHER PUBLICATIONS

Yoshiro Emori, Shu Namiki, 100nm bandwidth flat gain Raman amplifiers pumped and gain–equalized by 12–wavelength–channel WDM high power laser diodes, Opto Technology Laboratory, Furukawa Electric Co. Ltd., Japan.

Y. Emori, Y. Akasaka, S. Namiki, "Broadband lossless DCF using Raman amplification pumped by multichannel WDM laser diodes" Electronics Letters, Oct. 29, 1998, vol. 34, No. 22, pp. 2145–2146.

* cited by examiner

Primary Examiner—Mark Hellner
(74) Attorney, Agent, or Firm—Wendy Koba

(57) ABSTRACT

A Raman amplified transmission includes at least two pump sources to provide amplification to optical signals residing in the C-band (1530–1562 nm) and L-band (1574–1604 nm). The pump signals are chosen so as to provide for a relatively flat and wide composite gain spectrum with a width at least 50% greater than that generated by a monochromatic pump, while also chosen so as to prevent any four-wave mixing products from being in either the C- or L-bands.

13 Claims, 4 Drawing Sheets

REDUCTION OF FOUR-WAVE MIXING IN RAMAN AMPLIFIED OPTICAL TRANSMISSION SYSTEMS

TECHNICAL FIELD

The present invention relates to a Raman-amplified optical transmission system and, more particularly, to such a system with reduced four-waving mixing (FWM) by judicious choice of pump wavelengths with respect to signal wavelength(s).

BACKGROUND OF THE INVENTION

It has previously been shown that performance of optical transmission systems can be dramatically improved with the use of distributed Raman amplification. Raman amplification, in general, is a nonlinear optical process in which an intense pump wave is injected into an optical fiber that is carrying one or more optical information signals. If the pump wave is of a frequency approximately 13 THz lower than the signal waves (i.e., if the pump wavelength is roughly 100 nm shorter than the signal wavelength in the vicinity of 1500 nm), the pump will amplify the signal(s) via stimulated Raman scattering. If the amplification is made to occur in the transmission fiber itself, the amplifier is known as a distributed amplifier. Alternatively, a lumped or discrete amplifier can be constructed with a local length of Raman gain fiber. By amplifying the signals within the transmission span, the signals can be amplified before their signal-to-noise ratio degrades to an unacceptable level.

An advantage of Raman amplification is that a set of pump wavelengths may be combined to broaden and flatten the gain spectrum associated with the signal wavelengths. In a conventional optical transmission system, the signal wavelengths may fall within the range of 1520 to 1620 nm. Presuming that multiple pump wavelengths are used and that it is desirable to use wavelengths approximately 100 nm less than the signal wavelength, a set of pump wavelengths within the range of 1420 and 1520 nm would be associated with this signal wavelength regime. It has been discovered, however, that four-wave mixing of the pump wavelengths will occur, that is, when the two monochromatic (or quasi-monochromatic) pump wavelengths mix, and result in generation of light at the sum and difference frequencies associated with these two waves. Without further consideration, these sum and difference frequencies may reside in the same band as the input signals, an undesirable result.

In addition, there are examples in the art where multiple Raman pump wavelengths have been used to broaden the composite Raman gain spectrum. An article entitled "Broadband lossless DCF using Raman amplification pumped by multichannel WDM laser diodes" by Emori et al. appearing in Elec. Lett., Vol. 34, 1998 at p. 2145 describes an arrangement where four pumps at wavelengths 1435, 1450, 1465 and 1480 nm are utilized. They demonstrate that a substantially broader and flatter gain spectrum can be generated with this pump configuration, but no mention of the problems associated with the generation of four-wave mixing products is made. For this particular configuration, a four-wave mixing component would be generated at 1529 nm due to the mixing of the 1435 and 1480 nm waves. It is entirely possible that the C-band signals could extend to 1529 nm. In fact, the authors state that the dispersion-compensating fiber used as the Raman gain fiber can compensate the dispersion of conventional transmission fiber from 1520–1600 nm. Additional work by Emori et al. extended the same approach to include twelve pump wavelengths extending from 1405 to 1495 nm. This source would potentially generate deleterious FWM components throughout the C- and L-bands. Again, no mention of four-wave mixing among the pump wavelengths is made by the authors.

Thus, a need remains in the prior art for a Raman amplified system using multiple pump signals that avoids the above-described four-wave mixing problem.

SUMMARY OF THE INVENTION

The need remaining in the prior art is addressed by the present invention, which relates to a Raman-amplified optical transmission system and, more particularly, to such a system with reduced four-waving mixing (FWM) by judicious choice of pump wavelengths with respect to signal wavelength(s).

In accordance with the present invention, the pump wavelengths are chosen such that the sidebands associated with four-wave mixing products occur at wavelengths shorter than the predefined signal wavelengths or, alternatively, fall between predefined signal wavelength ranges.

In a preferred embodiment of the present invention, the signal wavelengths are defined as falling within two predetermined signal bands: a C-band (1530–1562 nm) and an L-band (1574–1604 nm). A guard band of approximately 1562–1574 nm is thus created between these two signal bands. The pump waves in accordance with the present invention, therefore, are chosen such that the four-wave mixing products either remain below 1530 nm or fall in the guard band of 1562–1574 nm. Pump wavelengths of 1447 nm and 1485 nm may be used to provide relatively flat gain while maintaining all four-wave mixing products below the C-band lower limit of 1530 nm. In another embodiment, pump wavelengths of 1442 and 1502 nm may be used, where the four-wave mixing products will reside within the guard band (1562–1574 nm).

In any embodiment of the present invention, the pump wavelengths are chosen to provide a relatively wide and flat composite gain spectrum, defined by a width at least 50% greater than that generated by a monochromatic pump, where the composite gain width is measured at the gain equal to one half the peak gain in decibels.

Other and further embodiments of the present invention will become apparent during the course of the following discussion and by reference to the accompanying drawings.

BRIEF DESCRIPTION OF THE INVENTION

Referring now to the drawings.

Figure 5:
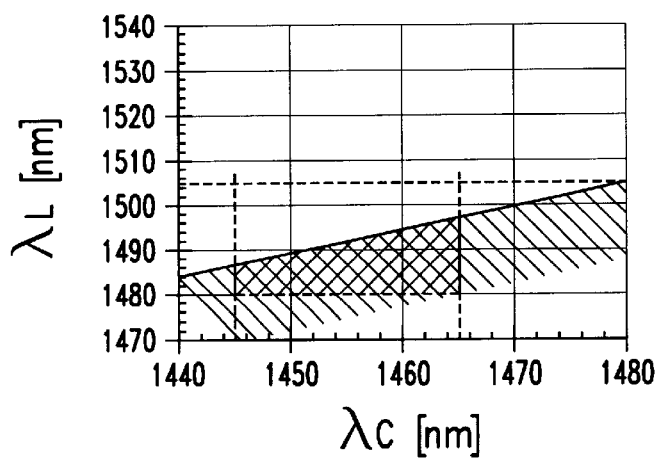
Figure 6:
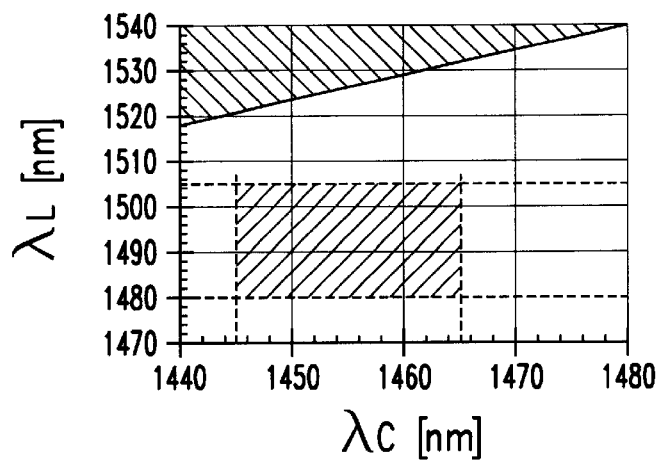
Figure 7:
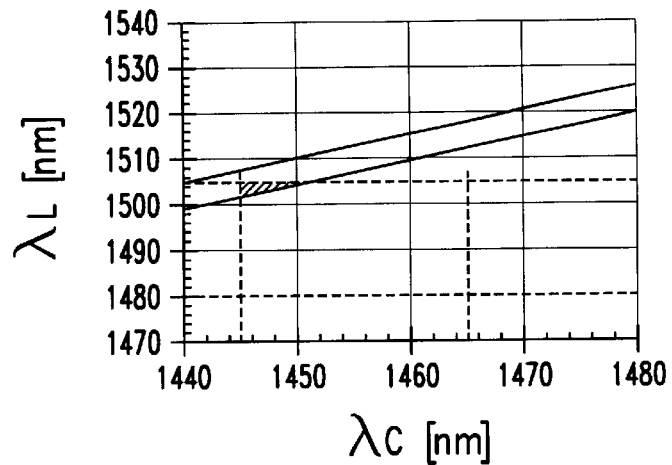
Figure 8:
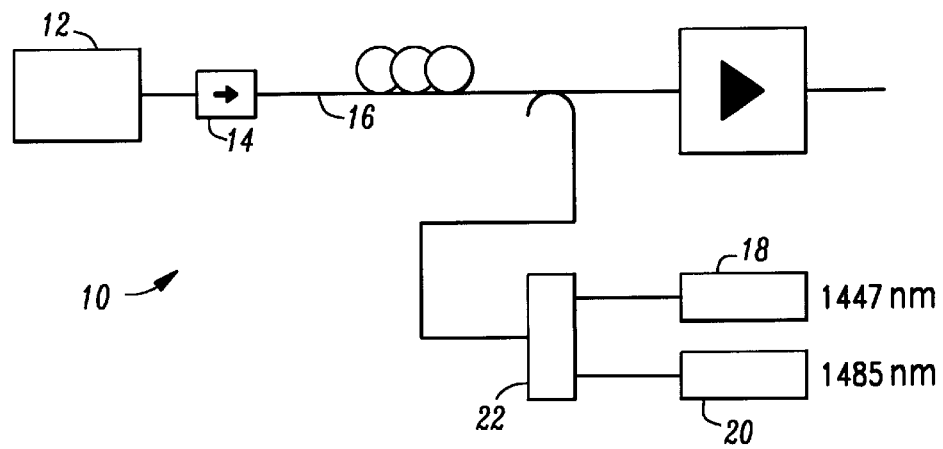
Figure 9:
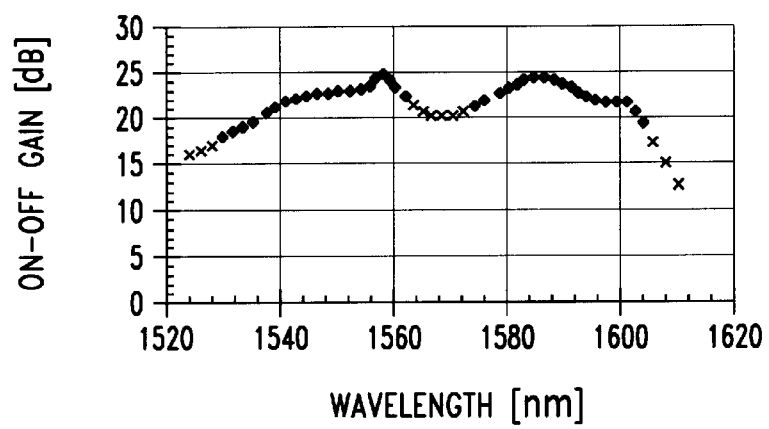
Figure 10:
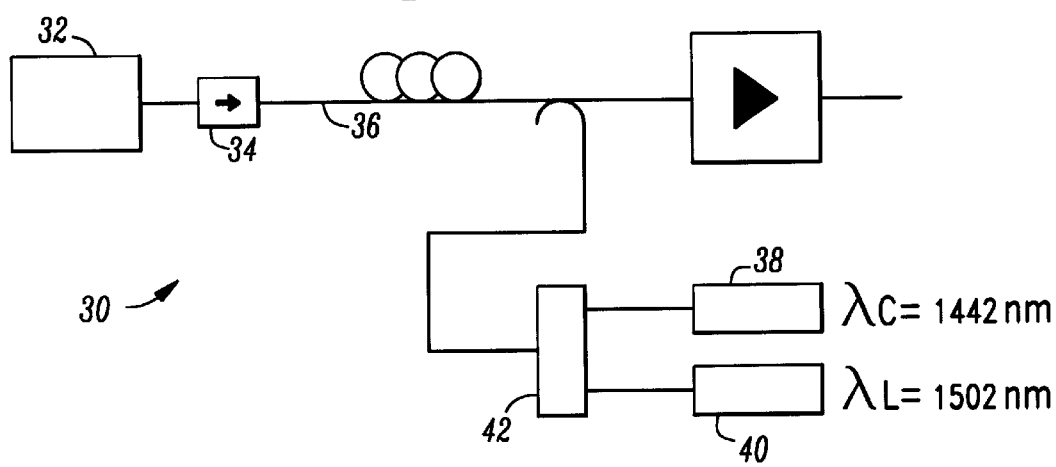
Figure 11:
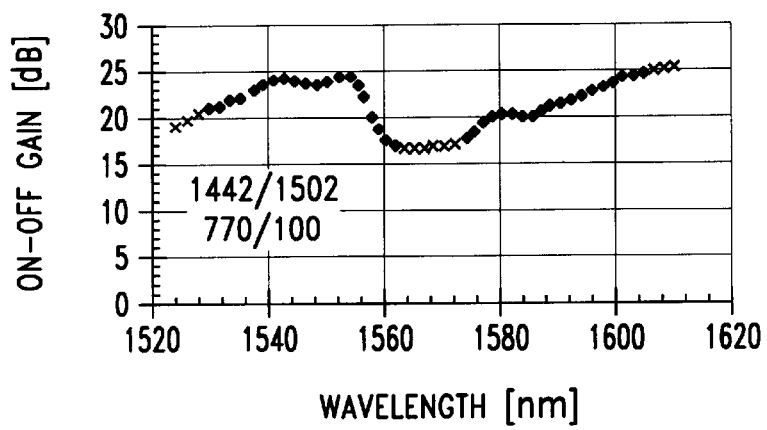
Figure 12:
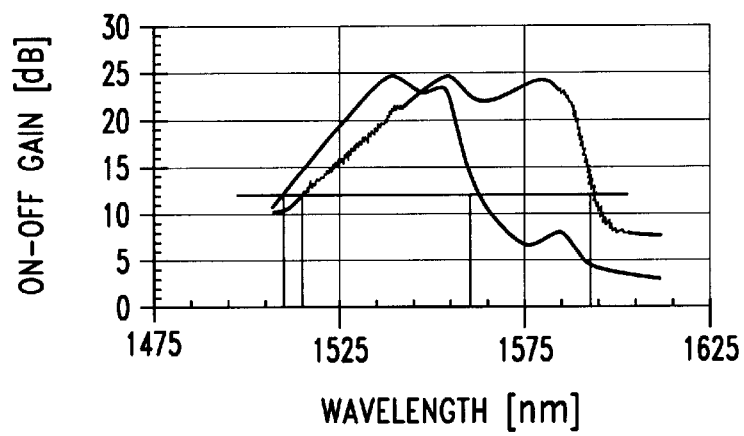

FIG. 5 indicates the useable pump wavelength space associated with maintaining all four-wave mixing products below the C-band signal region;

FIG. 6 indicates the available pump wavelength space associated with four-wave mixing products above the L-band signal region;

FIG. 7 illustrates the narrow pump wavelength space associated with maintaining the four-wave mixing products in the guard band between the C- and L-band signal regions;

FIG. 8 illustrates an exemplary optical transmission system utilizing a pair of pump signals that are chosen, in accordance with the present invention, to maintain the four-wave mixing products below the C-band region;

FIG. 9 is a graph of the "on-off" gain available from the system of FIG. 8, where on-off gain is defined as the ratio of the signal power at the end of the fiber with the pump "on" to that with the pump "off";

FIG. 10 illustrates an alternative optical transmission system of the present invention, with pump signals chosen to maintain the four-wave mixing products in the guard band region;

FIG. 11 is a graph of the "on-off" gain available from the system of FIG. 10; and FIG. 12 is a graph of the composite gain spectrum generated by a bichromatic pump as compared with the gain spectrum generated by a monochromatic pump.

DETAILED DESCRIPTION

In general, there are two separate constraints regarding the selection of pump wavelengths that must both be considered to avoid noise problems associated with four-wave mixing among the Raman pumps. An overall goal of providing optical gain using Raman amplification is to achieve a gain profile that is as flat and wide as possible. A first constraint, therefore, is the desire to use widely-separated pump wavelengths to provide the wide gain spectrum. Secondly, the presence of fiber nonlinearities is known to contribute to the presence of nonlinear mixing products. That is, when light at multiple wavelengths propagate simultaneously through the fiber, the power at different wavelengths interact and since the pump powers are relatively high, the nonlinear mixing products become significant.

Figure 1:
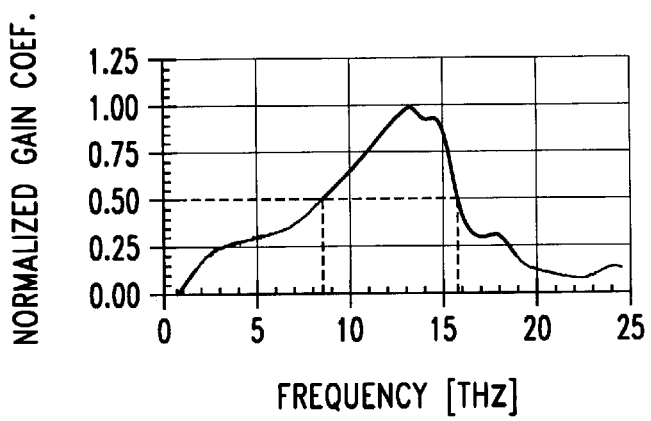
FIG. 1 is a graph illustrating the relationship between normalized Raman gain and the frequency separation between a pump and information signal.

FIG. 1 illustrates the normalized Raman gain spectrum versus frequency separation between an exemplary pump and signal, as measured in a typical transmission fiber. As shown, the gain exhibits a peak at 13 THz, the value of 13 THz defining the optimum separation between pump and signal frequency to achieve maximum gain. The value of 13 THz translates to a value of approximately 100 nm in terms of defining wavelength separation for wavelengths near 1500 nm. In communication systems based on Raman gain using a quasi-monochromatic pump and common germanosilicate fibers (as long as the signal frequencies fall in the band between 8.6 THz and 15.5 THz less than the pump frequency, as shown in FIG. 1), a gain of more than 50% of the peak gain in decibels will be achieved. In practice, the actual gain band values will depend upon the specific system design, including factors such as other gain mechanisms, gain flattening, multiple pumps, etc.

Figure 2:
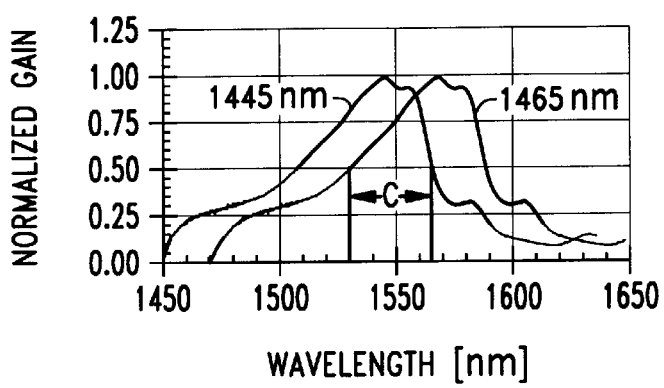
FIG. 2 illustrates the Raman spectra generated by pump wavelengths of 1445 nm and 1465 nm (for C-band signals)
Figure 3:
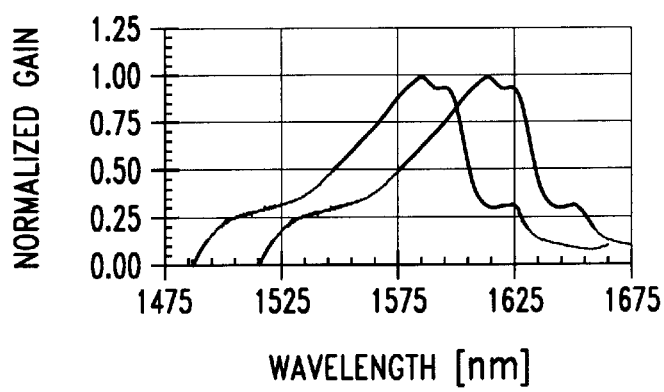
FIG. 3 illustrates the Raman spectra generated by pump wavelengths of 1480 nm and 1505 nm (for L-band signals)

As mentioned above, current optical transmission systems employing Raman gain generally use information signals within two different wavelength bands, the C-band (1530–1562 nm) and the L-band (1574–1604 nm), where it is to be understood that these are only exemplary wavelength ranges over which conventional erbium-doped fiber amplifiers work well. In general, other suitable wavelength ranges may be used when deriving suitable pump wavelengths in accordance with the teachings of the present invention. For the purposes of the present discussion, it will be assumed that a quasi-monochromatic pump with a frequency that is 8.6–15.5 THz greater than the signal frequency as to be used as a C-band pump. Under these conditions, the pump wavelength associated with amplifying C-band signals, denoted $\lambda_C$, needs to be within the wavelength range 1445–1465 nm. FIG. 2 illustrates the Raman spectra generated by pump wavelengths 1445 nm and 1465 nm, indicating the restrictions associated with providing gain in the C-band region. In accordance with the gain spectrum as shown in FIG. 1, the pump wavelength associated with amplifying L-band signals, denoted $\lambda_L$, needs to be within the wavelength range 1480–1505 nm to ensure a frequency difference between the L-band pump and L-band signals of 8.6–15.5 THz. FIG. 3 illustrates the Raman spectra associated with both 1480 nm and 1505 nm. The L-band limitations are as shown.

Figure 4:
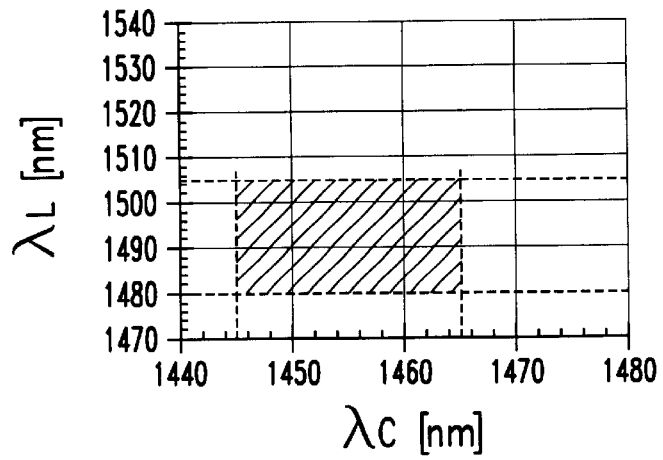
FIG. 4 illustrates, in graphical form, the "pump space" available for use in a system of the present invention.

Given these limitations on available pump wavelength ranges for achieving gain in the C-band and L-band, a "pump space" can be defined in terms of $\lambda_C$ and $\lambda_L$, as shown FIG. 4. As shown, the useable range for pump wavelengths $\lambda_C$ is plotted on the abscissa and the range for pump wavelengths $\lambda_L$ is plotted on the ordinate. The shaded area indicates the useable "pump space" for providing acceptable Raman gain in both the C- and L-bands. It is to be noted that this particular illustration of a "pump space" is exemplary only and is associated with the use of single pumps. The pump space would necessarily change as additional pump sources are added, as well as if the C- and L-bands are defined differently.

However, this useable space is reduced, in accordance with the teachings of the present invention, by taken into account the presence of four-wave mixing between pump wavelengths. In general, a first monochromatic lightwave at a frequency $\omega_1$ (with amplitude $E_1$), when propagating along the same path as a second monochromatic lightwave at a frequency $\omega_2$ (with amplitude $E_2$), will mix through the third order material polarization (denoted $P_{NL}$), with the result being generation of light at the sum and difference frequencies, defined as the four-wave mixing products, as expressed by the equation:

$$P_{NL} \; E_1^3 \exp(-i3\omega_1 t) + E_2^3 \exp(-i3\omega_2 t) +$$
$$(3|E_1|^2 + 6|E_2|^2)E_1 \exp(-i\omega_1 t) + (3|E_2|^2 + 6|E_1|^2)E_2 \exp(-i\omega_2 t) +$$
$$3E_1^2 E_2 \exp(-i(2\omega_1 + \omega_2)t) + 3E_1^2 E_2^* \exp(-i(2\omega_1 - \omega_2)t) +$$
$$3E_1 E_2^2 \exp(-i(\omega_1 + 2\omega_2)t) + 3E_1^* E_2^2 \exp(-i(-\omega_1 + 2\omega_2)t) + c.c$$

where "c.c." denotes the complex conjugate of the preceding terms.

In accordance with the present invention, the frequencies chosen for the pump frequencies are selected such that none of these mixing products falls within the signal bands. Since the signal frequencies will always be lower than the amplifying pump, only the following mixing terms:

$$3E_1^2 E_2^* \exp(-i(2\omega_1 - \omega_2)t) + 3E_1^* E_2^2 \exp(-i(-\omega_1 + \omega_2)t) + c.c$$

are of a concern. When looking at the desired pump frequencies, therefore, $\omega_1$ can be defined as the pump corresponding to the L-band signals (denoted $\omega_L^P$) and $\omega_2$ as the pump corresponding to the C-band signals (denoted $\omega_C^P$). Since, as mentioned above, the frequency of any signal is lower than the frequency of either a C band or L band pump ($\omega_{sig} < \omega_L^P, \omega_C^P$), the only relevant term that would attribute to a four-wave mixing problem, $\omega_{FWM}$, would be defined as follows:

$$\omega_{FWM} = 2\omega_L^P - \omega_C^P$$

In converting from frequency to wavelength, the same restriction can be defined as follows:

$$\lambda_{FWM} = \lambda_C \lambda_L / (2\lambda_C - \lambda_L),$$

where $\lambda_C$ is defined as the pump wavelength for signals in the C-band and $\lambda_L$ is denoted as the pump wavelength for signals in the L-band.

In accordance with the teachings of the present invention, the selection of pump wavelengths such that none of the four-wave mixing products fall within either the C- or L-bands results in two different system arrangements, as discussed in detail below. In the first case, a system can be designed so that the four-wave mixing products fall outside both signal bands, that is, either at shorter wavelengths than the C-band or at longer wavelengths than the L-band. FIG. 5 illustrates the "pump space" as derived for FIG. 4, with the inclusion of a line upon which the pumps would generate a four-wave-mixing product at 1530 nm. Any combination of pump wavelengths in the shaded region below this line would generate four-wave-mixing products at wavelengths less than 1530 nm. Combining this shading with the pre-defined pump space (as has been defined in terms of available gain), the area of overlap is then used to define the precise boundaries of pump wavelengths for both $\lambda_C$ and $\lambda_L$.

The case for generating the four-wave mixing products above the L-band is shown in FIG. 6, with the inclusion of a line upon which the pumps would generate a four-wave-mixing product at 1604 nm. Any combination of pump wavelengths in the shaded region above this line would generate four-wave-mixing products at wavelengths greater than 1604 nm. Thus, without other considerations, using pump wavelengths that fall within this region would prevent four-wave mixing components from appearing in either the C- or L-bands. However, it is obvious that there is no overlap between this shaded region and the previously-defined optimum gain region. Therefore, in accordance with the present invention, there are no pump wavelengths that are appropriate to use such that their four-wave mixing products would fall above the L-band signal range.

The second type of system that may be formed in accordance with the present invention is arranged such that the four-wave mixing products of the pumps falls within the guard band between the C- and L-bands. For the purposes of the present discussion, it will be assumed that the guard band is defined by the wavelength range of 1562 nm–1574 nm. FIG. 7 illustrates the pump space in which a four-wave-mixing product would fall in the guard band. As shown, the overlap of the shaded region between these wavelengths with the pump space results in an extremely restricted set of values that satisfy both conditions.

FIG. 8 illustrates an exemplary transmission system 10 employing a pair of pump waves at wavelengths $\lambda_C$ and $\lambda_L$ that fall within the shaded region of FIG. 5, thus forming an amplified transmission system where four-wave mixing products of the pumps fall below the lower bound of the C-band. As shown, the information signal is generated by an optical source 12, where the signal first passes through an isolator 14 and is thereafter injected into the optical transmission fiber 16. Raman amplification is achieved by coupling a pair of pump sources 18, 20 through a multiplexer 22 and into fiber 16. For the arrangement as shown in FIG. 8, the wavelength chosen for $\lambda_C$ is 1447 nm and the wavelength chosen for $\lambda_L$ is 1485 nm (indicated by open circles in the graph of FIG. 5), where the highest FWM component is found at value of 1525 nm (and therefore below the C-band lower bound of 1530 nm). In the embodiment of FIG. 8, the pumps are introduced as "counter-propagating" waves, with respect to the propagation direction of the input signal. Alternatively, the pumps could be applied as co-propagating waves. In yet another embodiment, one pump could be applied as a counter-propagating wave and the other as a co-propagating wave. Additionally, information signals may be propagating in both directions with any arrangement of pumps. In any arrangement, however, the four-wave mixing products of the longest wavelength would be at a wavelength shorter than 1530 nm, well below the signal band associated with the C-band input signal. FIG. 9 is a graph illustrating the "on-off" gain associated with system 10 as depicted in FIG. 8. The "on-off" gain is defined as the ratio of signal output power with the pump "on" and with the pump "off", respectively.

An alternative embodiment of the present invention is illustrated in FIG. 10, where this arrangement is used to ensure that the four-wave mixing products of the pumps reside in the guard band between the C- and L-signal bands. Referring to FIG. 10, a transmission system 30 includes an optical signal source 32 for providing the information signal that is to be amplified. The output from source 32 then passes through an isolator 34 and is coupled into a section of transmission fiber 36. A pair of optical pump sources 38, 40 are used to couple Raman gain pump signals at wavelengths $\lambda_C$ and $\lambda_L$, through a multiplexer 42 into transmission fiber 36. In this particular embodiment for maintaining the four wave mixing products in the guard band, a C-band pump wavelength of $\lambda_C$ of 1442 nm was chosen, for use with an L-band pump wavelength $\lambda_L$ of 1502 nm. With these values, the four-wave mixing component of concern falls at a wavelength of 1567 nm, well within the guard band. FIG. 11 illustrates the "on-off" gain associated with this embodiment. As with the arrangement utilizing pump wavelengths that keep the FWM products below the C-band, this embodiment results in also providing a relatively flat and wide gain. Thus, the choice between the two different embodiments may be based on other parameters.

It is to be understood that the various specific wavelength values discussed above are exemplary only. In general, the principles of the present invention are to ensure that the wavelengths associated with pump waves meet the two criteria of providing relatively wide and flat gain and ensuring that none of the FWM mixing products of the pump waves fall within any band associated with the signal transmission spectrum. Further, while the arrangements described above utilized only two pump waves, it is to be understood that three or more pump waves may be employed, as long as all of the associated FWM products meet the above criteria.

In order to quantify the separation between Raman pump wavelengths needed to generate a relatively wide and flat gain spectrum, it is useful to review the gain spectra plotted in FIG. 12. In particular, FIG. 12 illustrates the Raman gain spectrum for a monochromatic Raman pump at 1445 nm (solid curve) as compared to a composite gain spectrum generated by a bichromatic Raman pump at wavelengths 1445 nm and 1475 nm (dashed curve). It is seen that at the gain equal to one-half of the peak gain in decibels, the width of the composite gain spectrum for the bichromatic pump (i.e., 82 nm) is 50% wider than that of the monochromatic pump (i.e., 56 nm). An increase in the spectral width of the Raman gain shape of this approximate size is considered necessary to realize substantial improvements in the broadening of the gain shape. Therefore, in accordance with the present invention, the "pump space" is further defined by a pump configuration which generates a composite gain spectrum whose width is at least 50% greater than the width of the gain spectrum measured by a monochromatic pump, where spectral width is measured at the gain equal to one-half the peak gain in decibels.

Four-wave-mixing is well known in the art, typically where it is considered as mixing among signal wavelengths. Due to the typical maximum optical power of signals in fiber-optic communication systems (i.e., less than a few milliwatts), four-wave-mixing is generally important only for low group-velocity dispersions (i.e., less than a few ps/nm-km) and for relatively small channel spacings (i.e., less than a few nanometers). See, for example, *Optical Fiber Telecommunications, IIIA,* Kaminow et al, Academic Press, San Diego, 1997, at pp. 212 et seq., where it shows that four-wave-mixing is larger for larger powers, lower dispersion, and smaller channel spacings. In the case of the present invention, however, four-wave mixing is occurring among the Raman pumps. Given that Raman pump powers typically exceed 100 mW, and are therefore two orders of magnitude larger than typical signal powers, the generation of four-wave-mixing products is substantially increased. Given that substantial system penalties can be incurred for four-wave-mixing powers only $1/100$ of the signal powers, the four-wave-mixing conversion efficiency from the Raman pumps to the four-wave-mixing products need only be one part in 10,000 to cause substantial penalties. Thus, even for dispersions greater than a few ps/nm-km and for wavelength spacings among the Raman pumps as large as tens of nanometers, substantial penalties from four-wave-mixing may still occur.

In addition, for some of the above-mentioned geometries (e.g., the purely counter-propagating pump geometry), the four-wave-mixing products are initially counter-propagating relative to the signals. This alone would not induce system penalties. However, the counter-propagating four-wave-mixing products may be reflected due to a spurious reflection or may backscatter due to Rayleigh scattering. Although recaptured Rayleigh backscattering in fibers is typically much less than $10^{-3}$/km, once reflected or backscattered, the four-wave-mixing products are then amplified by the Raman gain itself, boosting the four-wave-mixing products to power levels that may degrade the performance of the system.

What is claimed is:

1. An optical transmission system comprising
   an optical fiber path, said optical fiber exhibiting a non-linear susceptibility so as to cause four-wave mixing between various optical waves passing therethrough;
   an optical signal source for providing an input optical signal, said optical signal source coupled to said optical fiber path; and
   at least two separate optical pump sources, coupled to said optical fiber transmission path, for introducing separate Raman gain amplification pumps at first and second wavelengths $\lambda_C$ and $\lambda_L$ onto said optical fiber path and providing Raman gain to the input optical signal passing therethrough, wherein the first and second wavelengths are chosen such that none of the four-wave mixing products of said first and second pump wavelengths coincide with the input signal wavelength, the pumps providing a composite gain spectrum whose width is at least 50% larger than the width of the gain spectrum associated with a monochromatic pump, where gain spectrum width is measured at the gain equal to one-half the peak gain in decibels.

2. An optical transmission system as defined in claim 1 wherein at least one of the first and second pump waves is introduced as a counter-propagating wave onto the optical fiber path.

3. An optical transmission system as defined in claim 1 wherein at least one of the first and second pump waves is introduced as a co-propagating wave onto the optical fiber path.

4. An optical transmission system as defined in claim 1 wherein the at least two pump waves comprise a pair of pump waves.

5. An optical transmission system as defined in claim 1 wherein the input optical signal comprises a predetermined first wavelength range and the at least two pump wavelengths are chosen such that the four-wave-mixing products associated with said at least two pump wavelengths are less than the shortest wavelength in the predetermined first wavelength range.

6. An optical transmission system as defined in claim 5 wherein the predetermined first wavelength range is defined as a C-band wavelength range, comprising wavelengths in the range of 1530–1562 nm.

7. An optical transmission system as defined in claim 1 wherein the input optical signal further comprises a predetermined second wavelength range encompassing wavelengths greater than said first wavelength range, wherein a guard band is defined as the spacing between said first wavelength range and said second wavelength range, the first and second pump wavelengths chosen such that all four-wave mixing products are either less than the lowest wavelength in the first wavelength range or within the guard band.

8. An optical transmission system as defined in claim 7 wherein the first wavelength range is defined as a C-band and comprises a wavelength range of 1530–1562 nm and the second wavelength range is defined as an L-band and comprises a wavelength range of 1574–1604 nm.

9. An optical transmission system as defined in claim 7 wherein the guard band is defined as comprising the wavelength range of 1562–1574 nm.

10. An optical transmission system as defined in claim 1 wherein the difference between the pump frequency and signal frequency is chosen to remain in the range of 8.6 to 15.5 THz.

11. An optical transmission system as defined in claim 10 wherein the difference between the pump frequency and signal frequency is approximately 13 THz.

12. An optical transmission system as defined in claim 10 wherein the first and second pump wavelengths are chosen such that the four-wave mixing products remain less than 1530 nm.

13. An optical transmission system as defined in claim 12 wherein the first pump wavelength comprises a value of approximately 1447 nm and the second pump wavelength comprises a value of approximately 1485 nm.

* * * * *